United States Patent
Holt et al.

(10) Patent No.: US 9,721,254 B2
(45) Date of Patent: Aug. 1, 2017

(54) METHOD AND APPARATUS FOR PROVIDING STREAMING MEDIA PROGRAMS AND TARGETED ADVERTISEMENTS USING MULTIPLE ADVERTISEMENT VERSION SEGMENTS

(75) Inventors: William Z. Holt, Pasadena, CA (US); Xinan Wu, Santa Monica, CA (US); Eden S. Li, Santa Monica, CA (US); Baptiste Coudurier, Los Angeles, CA (US); Alexander V. Gutarin, Beverly Hills, CA (US)

(73) Assignee: HULU, LLC, Santa Monica, CA (US)

( * ) Notice: Subject to any disclaimer, the term of this patent is extended or adjusted under 35 U.S.C. 154(b) by 250 days.

(21) Appl. No.: 12/950,563

(22) Filed: Nov. 19, 2010

(65) Prior Publication Data

US 2011/0320287 A1 Dec. 29, 2011

Related U.S. Application Data

(60) Provisional application No. 61/359,319, filed on Jun. 28, 2010, provisional application No. 61/359,309, (Continued)

(51) Int. Cl.
*G06Q 30/00* (2012.01)
*G06F 15/16* (2006.01)
(Continued)

(52) U.S. Cl.
CPC ......... *G06Q 30/00* (2013.01); *G06Q 30/0277* (2013.01); *H04N 21/235* (2013.01);
(Continued)

(58) Field of Classification Search
CPC .... G06Q 30/00; G06Q 30/02; G06Q 30/0241; G06Q 30/0277
(Continued)

(56) References Cited

U.S. PATENT DOCUMENTS 6,281,940 B1 8/2001 Sciammarella
6,892,353 B1 5/2005 Ubillos
(Continued)

FOREIGN PATENT DOCUMENTS

EP 2023627 2/2009
GB 2457892 9/2009
(Continued)

OTHER PUBLICATIONS

International Search Report, PCT Application No. PCT/US2011/041778, mailed Oct. 26, 2011.
(Continued)

*Primary Examiner* — Amanda Abrahamson
*Assistant Examiner* — Marilyn G Macasiano
(74) *Attorney, Agent, or Firm* — Fountainhead Law Group P.C.

(57) ABSTRACT

A method, apparatus, article of manufacture, and a memory structure for providing advertisements with a media program transmitted to a user device are described. Different versions of a media program and advertisements are generated and segmented, and transmitted to a media player individually, allowing different advertisements to be selected for presentation to users according to user demographics and other factors.

18 Claims, 11 Drawing Sheets

Related U.S. Application Data filed on Jun. 28, 2010, provisional application No. 61/359,258, filed on Jun. 28, 2010.

(51) Int. Cl.

| | |
|---|---|
| *G06Q 30/02* | (2012.01) |
| *H04N 21/235* | (2011.01) |
| *H04N 21/258* | (2011.01) |
| *H04N 21/262* | (2011.01) |
| *H04N 21/472* | (2011.01) |
| *H04N 21/81* | (2011.01) |
| *H04N 21/845* | (2011.01) |

(52) U.S. Cl.
CPC . *H04N 21/25866* (2013.01); *H04N 21/26258* (2013.01); *H04N 21/47202* (2013.01); *H04N 21/812* (2013.01); *H04N 21/8456* (2013.01)

(58) Field of Classification Search
USPC .............. 715/733; 725/42; 705/14.73, 14.49; 709/231
See application file for complete search history.

(56) References Cited

U.S. PATENT DOCUMENTS

| | | | |
|---|---|---|---|
| 6,990,637 | B2 | 1/2006 | Anthony et al. |
| 7,165,219 | B1 | 1/2007 | Peters et al. |
| 7,197,557 | B1 | 3/2007 | Asar et al. |
| 7,818,444 | B2 * | 10/2010 | Brueck et al. ................ 709/231 |
| 7,823,056 | B1 | 10/2010 | Davey et al. |
| 9,448,723 | B2 | 9/2016 | Wong et al. |
| 2002/0133247 | A1 | 9/2002 | Smith et al. |
| 2005/0252959 | A1 | 11/2005 | Gaumond et al. |
| 2005/0278761 | A1 | 12/2005 | Gonder et al. |
| 2006/0033721 | A1 | 2/2006 | Woolley et al. |
| 2007/0021152 | A1 | 1/2007 | Jung |
| 2007/0083822 | A1 | 4/2007 | Robbin et al. |
| 2007/0136488 | A1 | 6/2007 | Cho et al. |
| 2007/0157241 | A1 | 7/2007 | Walker |
| 2007/0192193 | A1 * | 8/2007 | Haberman et al. ............. 705/14 |
| 2008/0134043 | A1 * | 6/2008 | Georgis et al. ............... 715/733 |
| 2008/0155590 | A1 | 6/2008 | Soukup et al. |
| 2008/0238708 | A1 | 10/2008 | Pittard et al. |
| 2009/0094634 | A1 | 4/2009 | Haberman et al. |
| 2009/0106082 | A1 | 4/2009 | Senti et al. |
| 2009/0150941 | A1 | 6/2009 | Riedl et al. |
| 2009/0164944 | A1 | 6/2009 | Webster et al. |
| 2009/0185619 | A1 | 7/2009 | Taleb et al. |
| 2009/0287841 | A1 | 11/2009 | Chapweske et al. |
| 2010/0030644 | A1 * | 2/2010 | Dhamodharan ........... 705/14.49 |
| 2010/0057928 | A1 | 3/2010 | Kapoor et al. |
| 2010/0077095 | A1 | 3/2010 | Wong et al. |
| 2010/0106852 | A1 | 4/2010 | Kindig et al. |
| 2010/0107126 | A1 | 4/2010 | Lin et al. |
| 2010/0121891 | A1 | 5/2010 | Zampiello |
| 2010/0131993 | A1 | 5/2010 | Sanitate et al. |
| 2011/0072105 | A1 | 3/2011 | Biderman |
| 2011/0082915 | A1 | 4/2011 | Carr et al. |
| 2011/0087553 | A1 * | 4/2011 | Mishra et al. ............. 705/14.73 |
| 2011/0131607 | A1 | 6/2011 | Thomas et al. |
| 2011/0145726 | A1 | 6/2011 | Wei et al. |
| 2011/0246661 | A1 * | 10/2011 | Manzari et al. .............. 709/231 |
| 2011/0320626 | A1 | 12/2011 | Wong et al. |
| 2011/0320945 | A1 | 12/2011 | Wong et al. |
| 2012/0047166 | A1 | 2/2012 | Katz |
| 2013/0166765 | A1 * | 6/2013 | Kaufman ..................... 709/231 |
| 2014/0310757 | A1 | 10/2014 | Ho et al. |

FOREIGN PATENT DOCUMENTS

| | | |
|---|---|---|
| JP | 2001-359073 A | 12/2001 |
| JP | 2003-242074 A | 8/2003 |
| JP | 2004-064330 A | 2/2004 |
| JP | 2004-356867 A | 12/2004 |
| JP | 2005-295467 A | 10/2005 |
| JP | 2006-501711 A | 1/2006 |
| JP | 2008-306600 A | 12/2008 |
| JP | 2009-522850 A | 6/2009 |
| JP | 2010-109791 A | 5/2010 |
| WO | 2005029770 | 3/2005 |
| WO | 2008/007677 A1 | 1/2008 |
| WO | 2008-121639 A1 | 10/2008 |
| WO | 2010-058549 A1 | 5/2010 |
| WO | 2010-078281 A2 | 7/2010 |

OTHER PUBLICATIONS

U.S. Appl. No. 12/896,803, filed Oct. 1, 2010 entitled "Method and Apparatus for Intuitive Navigation of a Media Program".
U.S. Appl. No. 12/912,020, filed Oct. 26, 2010 entitled "Method and Apparatus for Synchronizing Paused Playback Across Platforms".
International Search Report, PCT Application No. PCT/US2011/041898, mailed Oct. 28, 2011.
International Search Report, PCT Application No. PCT/US2011/041774, mailed Nov. 3, 2011.
European Search Report mailed May 9, 2014 from European Application No. 11807256.0, 7 pages.
Extended European Search Report, mailed Aug. 7, 2015, from a corresponding foreign application), EP 11807255.2.

\* cited by examiner

```
#EXTM3U
#EXT-X-VERSION:2
#EXT-X-STREAM-INF:PROGRAM-ID=1,BANDWIDTH=1500000
https://play.hulu.com/play/50000011/1500.m3u8?b=IUFfAAK7tmFfAAK7cXFfAAK7tmFfAAK75g&auth=1275693133_5741adc3bf3b05dde40a764ccbf4a580
#EXT-X-STREAM-INF:PROGRAM-ID=1,BANDWIDTH=3200000
https://play.hulu.com/play/50000011/3200.m3u8?b=IUE_AAK7uGE_AAK7iGE_AAK7iGE_AAK7uGE_AAK76Q&auth=1275693133_35fe265cbda4a38a8476dda286441425
#EXT-X-STREAM-INF:PROGRAM-ID=1,BANDWIDTH=2500000
https://play.hulu.com/play/50000011/2500.m3u8?b=IUE_AAK7uGE_AAK7iGE_AAK7iGE_AAK7uGE_AAK76Q&auth=1275693133_afc6f221eec4ff3feCc9a3759b293716
#EXT-X-STREAM-INF:PROGRAM-ID=1,BANDWIDTH=1000000
https://play.hulu.com/play/50000011/1000.m3u8?b=IUFfAAK7cWFfAAK7cXFfAAK7tmFfAAK75g&auth=1275693133_1fb1bdb09679b5d15b4a6d42a077.32a6
#EXT-X-STREAM-INF:PROGRAM-ID=1,BANDWIDTH=400000
https://play.hulu.com/play/50000011/400.m3u8?b=IUENAAK7tGENAAK7d2ENAAK7d3ENAAK7tGENAAK77A&auth=1275693133_c594ccb82222ce3d2b78f97351 9ab046
#EXT-X-STREAM-INF:PROGRAM-ID=1,BANDWIDTH=200000
https://play.hulu.com/play/50000011/200.m3u8?b=IUEGAAK7wGEGAAK7e3EGAAK7e3EGAAK7wGEGAAK78A&auth=1275693133_di5798fec9d1a823b0d5d2eca abb9 59
#EXT-X-STREAM-INF:PROGRAM-ID=1,BANDWIDTH=128000
https://play.hulu.com/play/50000011/128.m3u8?b=IUECAAK7eWECAAK7eXECAAK7eXECAAK7vmECAAK77g&auth=1275693133_f7684af26d68e76be6921424688b9b5a
#EXT-X-STREAM-INF:PROGRAM-ID=1,BANDWIDTH=64000
https://play.hulu.com/play/50000011/64.m3u8?b=IUEGAAK7wGEGAAK7e2EGAAK7e3EGAAK7e3EGAAK78A&auth=1275693133_eafef75f4e967d030fed5bf815f9596
```

900

902A, 902B, 902C, 902D, 902E, 902F, 902G, 902H

PID | filename | advertisement segment IDs 904 | authorization tokens

FIG. 9

```
#EXTM3U
#EXT-X-VERSION:2
#EXT-X-TARGETDURATION:14
#EXT-X-MEDIA-SEQUENCE:0
#EXT-X-ALLOW-CACHE:NO
#EXTINF:4,
http://assets.huluim.com/prerolls/np/abc-preroll-480k_1000/segment0.ts
#EXT-X-DISCONTINUITY
#EXTINF:10,
http://ads.hulu.com/published_staging/IO105288/Office_Race_30_KROR9303_Hulu_Mezz_30fps_Stagi561041_samourai.tar/segment0.ts
#EXTINF:11,
http://ads.hulu.com/published_staging/IO105288/Office_Race_30_KROR9303_Hulu_Mezz_30fps_Stagi561041_samourai.tar/segment1.ts
#EXTINF:10,
http://ads.hulu.com/published_staging/IO105288/Office_Race_30_KROR9303_Hulu_Mezz_30fps_Stagi561041_samourai.tar/segment2.ts
#EXT-X-DISCONTINUITY
#EXT-X-KEY:METHOD=AES-128,URI="https://hulus-a.akamaihd.net/hulu12/11/50000011/agave50000011_586724_samourai.tar/agave50000011_586724_samourai.key?v=0&authToken=1275...F449
#EXTINF:10,
https://hulus-a.akamaihd.net/hulu12/11/50000011/agave50000011_586724_samourai.tar/segment0.ts?authToken=1275...a744c
#EXTINF:10,
https://hulus-a.akamaihd.net/hulu12/11/50000011/agave50000011_586724_samourai.tar/segment1.ts?authToken=1275...7ea20
#EXTINF:11,
https://hulus-a.akamaihd.net/hulu12/11/50000011/agave50000011_586724_samourai.tar/segment2.ts?authToken=1279...2e
```

FIG. 10

METHOD AND APPARATUS FOR PROVIDING STREAMING MEDIA PROGRAMS AND TARGETED ADVERTISEMENTS USING MULTIPLE ADVERTISEMENT VERSION SEGMENTS

CROSS REFERENCE TO RELATED APPLICATIONS

This application claims benefit of U.S. Provisional Patent Application Ser. No. 61/359,319, filed Jun. 28, 2010, by William Z. Holt, Xinan Wu, Eden Li, Baptiste Coudurier and Alexander V. Gutarin, which application is hereby incorporated by reference herein.

This application is also related to the following patent application(s), all of which applications are incorporated by reference herein:

Application Ser. No. 61/359,309, entitled "METHOD AND APPARATUS FOR INTUITIVE NAVIGATION OF A MEDIA PROGRAM," filed on same date herewith, by Robert M. Wong, Charles B. Reeves, and Eugene Chan-Huai Wei; and Application Ser. No. 61/359,258, entitled "METHOD AND APPARATUS FOR SYNCHRONIZING PAUSED PLAYBACK ACROSS PLATFORMS," filed on same date herewith, by Robert M. Wong and Eden Li.

BACKGROUND OF THE INVENTION

1. Field of the Invention

The present invention relates to systems and methods for providing streaming media to users live streaming protocols, and in particular, to a system and method for including directed advertising in said streaming media.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

Progressive Downloading

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user device for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user device using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) do not permanently store the video file in the viewer's computer (the file is ultimately discarded by the media player, thus allowing more control over the content).

Streaming media servers may use HTTP and TCP to deliver video streams, but generally use RTSP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Mobile Devices

There is a desire to transmit media programs to mobile media program playback devices such as cellphones, IPHONES, personal data assistants (PDAs), laptop computers and the like. Transmission of media programs to mobile devices offers additional challenges, as the bandwidth of the communication channel is typically reduced, and the processing power of the device itself is typically less than that of an ordinary computer or special purpose device.

Transmission protocols have been developed to transmit media programs (including live media programs) to such devices. The transmission of live media programs can be even more challenging as the length of such streams is unbounded. One such transmission protocol is the HTTP live streaming protocol of the IETF (Internet Engineering Task Force) Trust as described in http://tools.ietf.org/html/draft-pantos-http-live-streaming and in U.S. Provisional Patent Application Ser. No. 61/359,319, which is hereby incorporated by reference herein.

Incorporation of Advertisements

The delivery of media programs can be accomplished under a variety of models. In one model, the user pays for the viewing of the media program (for example, using a pay-per-view service). In another model widely adopted by broadcast television shortly after it's inception, sponsors pay for the presentation of the media program in exchange for the right to present advertisements during or adjacent to the presentation of the program.

The advertising model works best if the viewer is presented with advertisements that are of interest to them. In the past, advertisers could only attempt to target advertisements at viewers interested in their products by assuring that the advertisements were shown during media programs likely to be watched by the demographic of interest. However, the advent of digital technology and delivery of media programs via the Internet allows advertisements to be more specifically directed to particular users. For example, a registered user may be known to be male, 25-30 years old, and unmarried. These demographics can be used along with other information (for example, which media programs the viewer has watched in the past or which advertisements have had a positive response to in the past) to decide which advertisements to show to the user.

Throughput

Whether via HTTP, TCP, RTSP, UDP, or live streaming, the throughput of the communications channel used to transceive media programs is highly variable and difficult to predict. Accordingly, media servers typically store several different versions of each media program, with each different version optimized for different communications channel throughput, and the appropriate version is selected for transception based upon the communications channel throughput.

However, the bit rate of streamed media programs is not temporally constant, but varies widely over time. Communication channel throughput may also change over time. These temporal variations give rise to situations wherein the bandwidth of the communications channel is sufficient or more than is required for portions of the media program, but insufficient for other portions. Such variations cause the media program player to switch from one version of the media program to another, to assure adequate playback. Such switching is typically done without regard to advertisement considerations and hence, can result in interrupted or choppy playback. Accordingly, there is a need for system, apparatus, and method for reducing or eliminating such problems. The present invention satisfies this need.

SUMMARY OF THE INVENTION

To address the requirements described above, a method, apparatus, article of manufacture, and a memory structure for streaming a media program having advertisements included therein is disclosed. In one embodiment, a media program provider generates a plurality of media program versions, each of the plurality of versions generated for a different presentation throughput than the other of the plurality of versions, segments each of the media program versions into a plurality of media program segments, generates a plurality of advertisement versions, each of the plurality of advertisement versions associated with one of the media program versions and generated for transmission at the data rate of the associated media program version, and segments each of the advertisement versions into a plurality of advertisement segments. The media program provider then receives a media program request from a media program player, the media program request having a media program identifier, and transmits a master playlist generated from the first message to the media program player, the master playlist comprising a plurality of addresses, each associated with one of the plurality of media program versions and transmits a segment playlist to the media program player. In one embodiment, the segment playlist is associated with one of the media program versions and comprises a temporally ordered list having an address associated with each one of the plurality of media program segments associated with the one of the media program versions and an address associated with each one of the plurality of advertising segments associated with the advertisement version associated with the one of the media program versions.

BRIEF DESCRIPTION OF THE DRAWINGS

Referring now to the drawings in which like reference numbers represent corresponding parts throughout:

FIG. 9 is a diagram illustrating an exemplary master playlist; and

FIG. 10 is a diagram showing one embodiment of a segment playlist.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
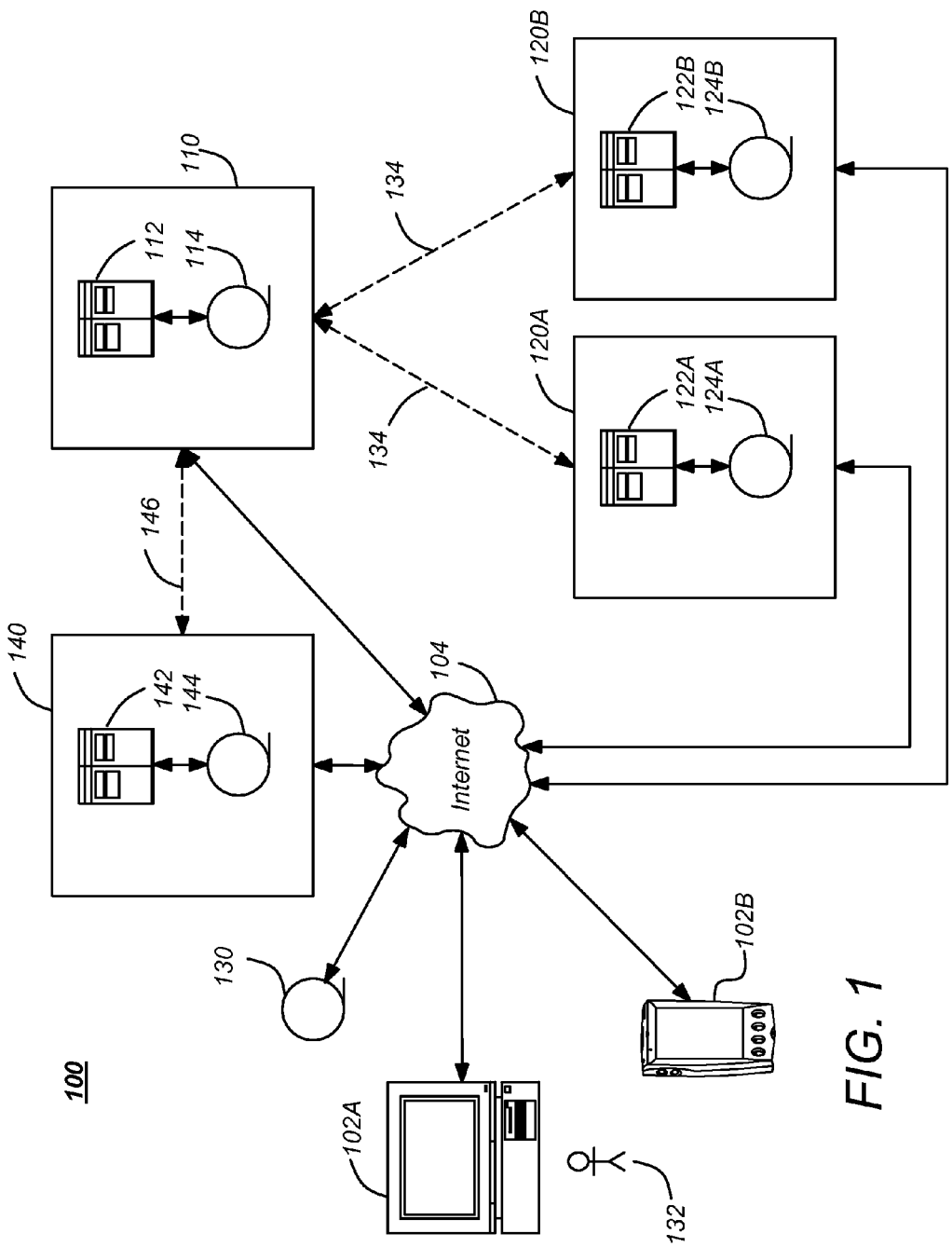
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 102). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user device 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device 102 at the appropriate time.

In one embodiment, the advertisements are integrated with the streamed or downloaded video from the media program provider 110. In another embodiment, the advertisements are not integrated with the media program, but are instead transmitted to the user device 102 separately from the media program, and replayed at the appropriate time using indices that indicate when each advertisement should be presented. For example, advertisements can be indexed and streamed or downloaded to the user device 102 (from the media program provider 110 or the advertisement provider 140), and such advertisements can be played back to the user 132 at times indicated by corresponding indices in the media program.

Figure 2:
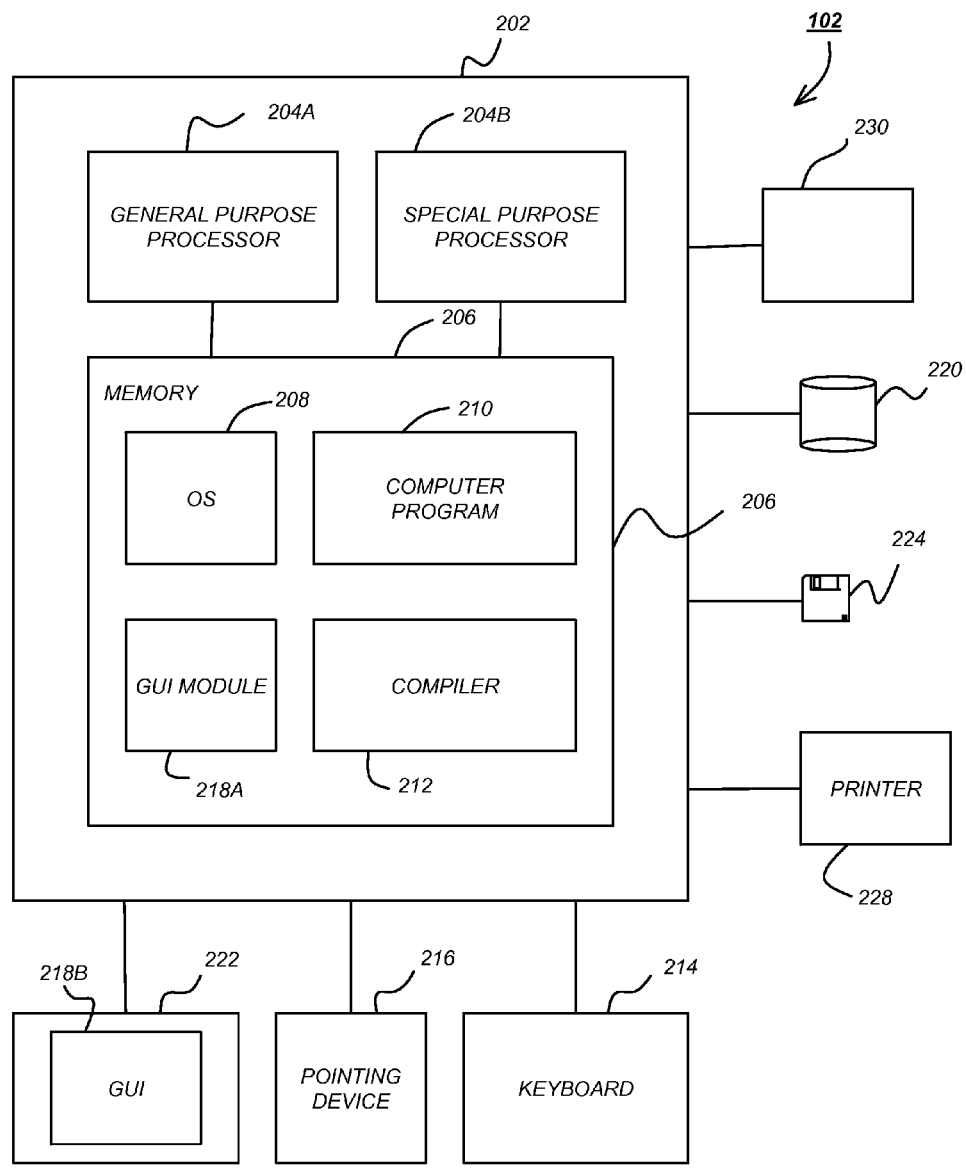
FIG. 2 illustrates an exemplary user device that could be used to implement the present invention.

FIG. 2 illustrates an exemplary system 202 that could be used to implement elements of the present invention, including the user device 102, servers 112, 122, and 142 and the databases 114, 124, and 144. The system 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a pointing device 216 such as a mouse, touch pad, or trackball and a printer 228.

In one embodiment, the system 202 operates by the general purpose processor 204A performing instructions defined by the computer program 210 under control of an operating system (OS) 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the system 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The system 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the system 202 using the relationships and logic that was generated using the compiler 212.

The system 202 also optionally comprises an external communication device such as a modem, satellite link, Ethernet card, wireless link, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the system 202, causes the system 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the system 202.

The "user device" is referred to herein, may include a user computer, IPHONE, IPOD, IPAD, portable telephone, cellphone, portable MP3 or video player, video game consoles, notebook computer, pocket computer, personal data assistant (PDA) such as a PALM device, or any other device with suitable processing, communication, and input/output capability.

Figure 3:
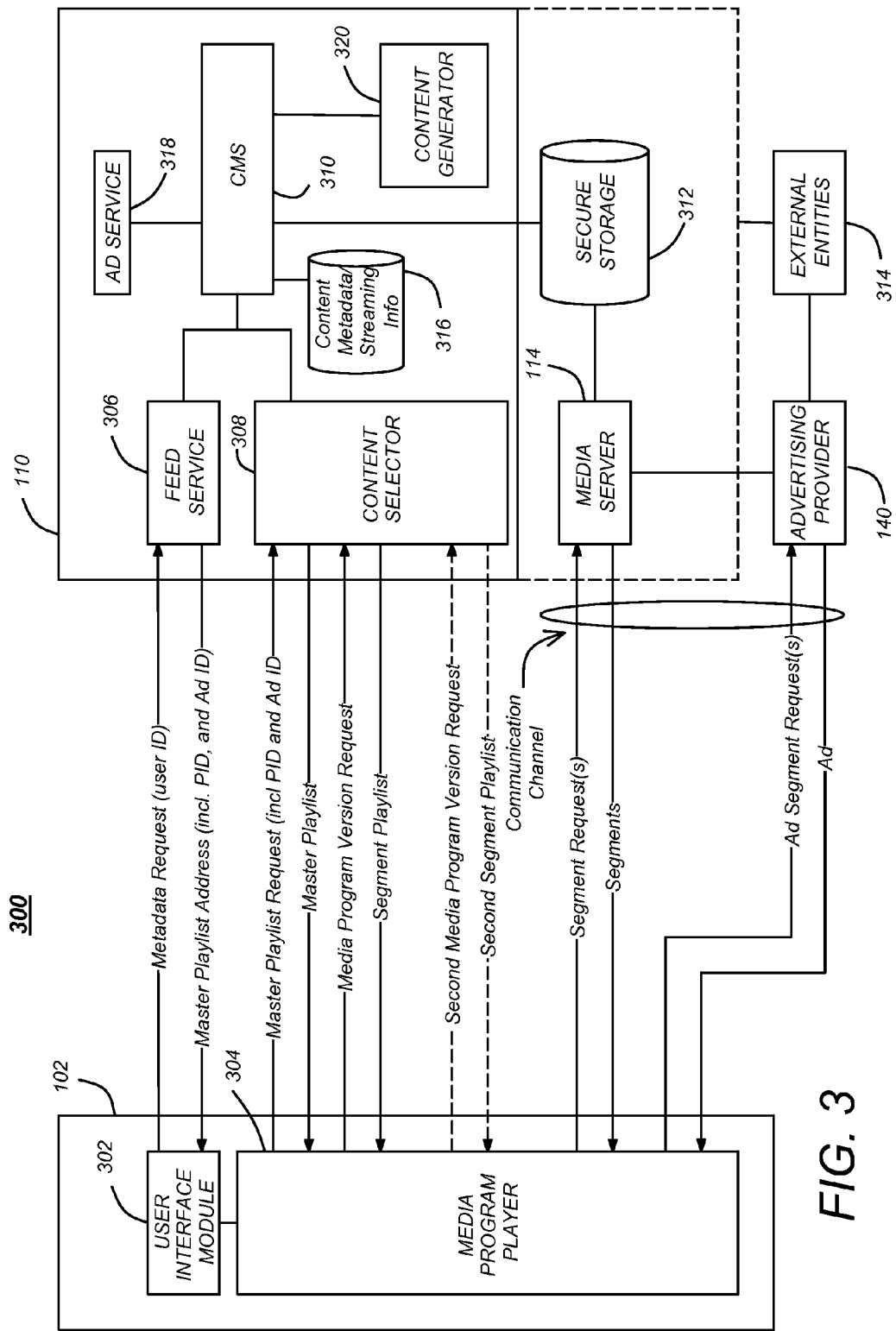
FIG. 3 is a diagram illustrating a content delivery subsystem and top-level operations that can be used to deliver media programs and advertisements for presentation to a user.

FIG. 3 is a diagram illustrating one embodiment of a content delivery subsystem (CDS) 300 and top-level operations that can be used to deliver media programs and advertisements for presentation to a user 132. In the illustrated embodiment, the content delivery subsystem 300 includes the user device 102, a media program provider 110, and an advertisement provider 140.

The media program provider 110 communicates with the user device 102 and the advertisement provider to provide media programs and advertisements to the user 132 via the user device 102. Although the advertisement provider 140 is illustrated as a separate architectural entity than the media program provider 110, the advertisement provider 140 may be integrated with the media program provider 110 (that is, the media program provider 110 may also provide the advertisements). The media server 114 also may be part the media program provider 110 or a separate entity. The CDS 300 provides a means to provide media programs and advertisements across a plurality of distribution networks, which may include www.hulu.com, www.imdb.com, www.aol.com or www.msn.com.

Metadata related to media program and advertisement content as well as streaming information is stored in the content delivery system 300 in database 316, as is data describing where the media programs and advertisements may be found within the CDS 300.

In the illustrated embodiment, the user device 102 includes an interface module 302 and a media program player 304. The interface module 302 includes instructions performed by the processor of the user device 102 to present information and media programs to the user 132 and to accept user input, including commands. Although the user interface module 302 is illustrated as being implemented separate from the media program player 304, the user interface module 302 may be integrated with the media program player 304.

Simple and effective data transfer protocols have been developed for use in the transmission and presentation of media programs on portable user devices. These protocols transmit small segments of the media program to the user device and allow the user device to select whether it will receive segments that require greater transmission bandwidth and media program player processing power (hereinafter referred to as presentation throughput) or lower resolution segments that require presentation throughput.

Figure 4:
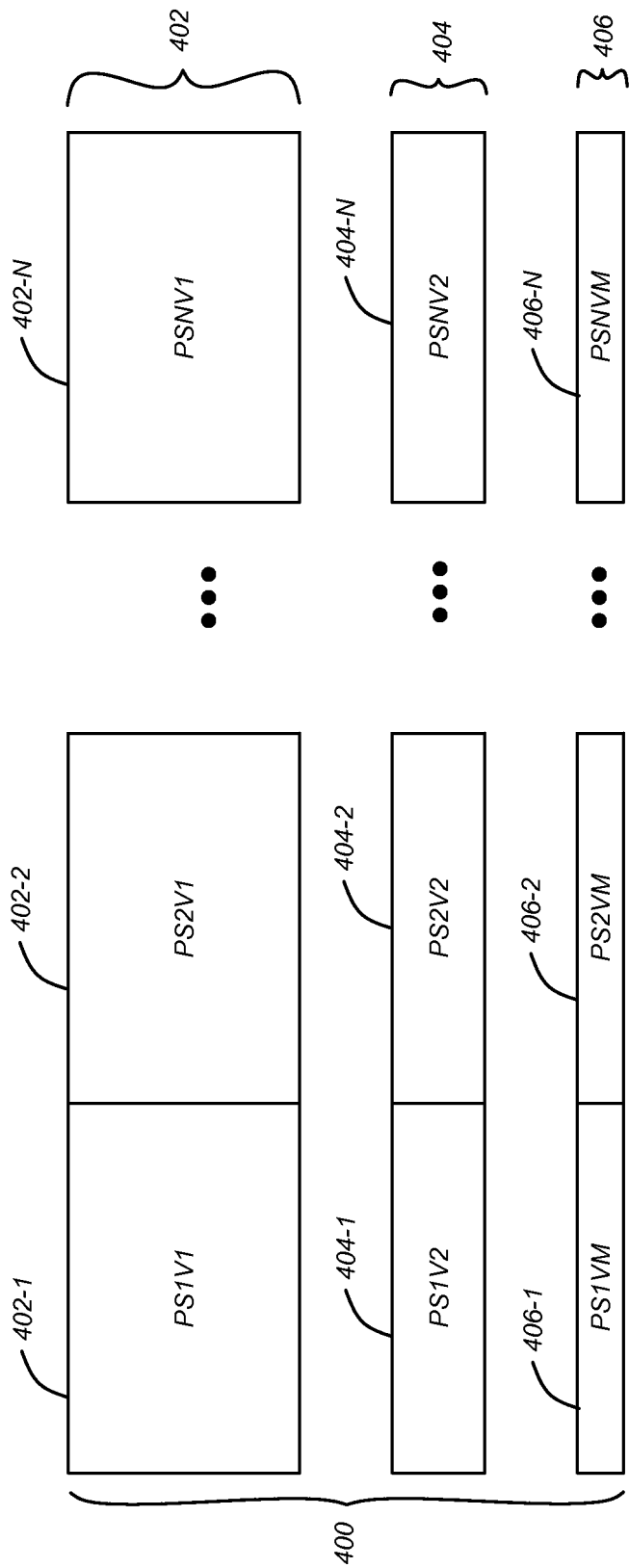
FIG. 4 is a diagram illustrating the segmentation of different versions of a media program and an advertisement.

FIG. 4 is a diagram illustrating an aspect of a media program transmission protocol. The media program provider 110 or another entity generates multiple different versions of the media program, each suitable for a different presentation throughput. In the illustrated embodiment, three versions are created, a high presentation throughput version 402, a medium presentation throughput version 404, and a low presentation throughput version 406. Furthermore, each version 402-404 of the media program is separated into a plurality of segments. For example, in FIG. 4, the first version 402 of the media program is separated into N segments 402-1 through 402-N, the second version 404 of the media program is also separated into N segments 404-1 through 404-N, and the third version 406 of the media program is separated into N segments 406-1 through 406N.

In the illustrated embodiment, all of the segments of any particular version are of equal temporal length (e.g. temporal segment 402-1 is the same temporal length as temporal segment 402-2), but this need not be the case. Also, in the illustrated embodiment, each version of the media program includes the same number of segments (e.g. version 402, 404 and 406 all include N segments), but this need not be the case. Further, all of the versions of each corresponding temporal segment will ordinarily be the same temporal length (in other words, segment 402-1 will typically be the same temporal length as 404-1), but this also need not be the case. Instead, temporal segments of different versions may be of different temporal length so long as the segments are temporally aligned at the time when an advertisement is to be inserted. For example, if first version 402 has N temporally equal segments and second version 404 has 2N temporally equal segments, the length of segment 402-1 will be twice that of the second version segments.

Although only three versions of the media program are illustrated, the number of different media programs could be as little as two or as many as is needed. Typically, the number of versions is a tradeoff between the storage, generation, and management of the different versions and the conservation of transmission bandwidth and media program player processing requirements.

Figure 5:
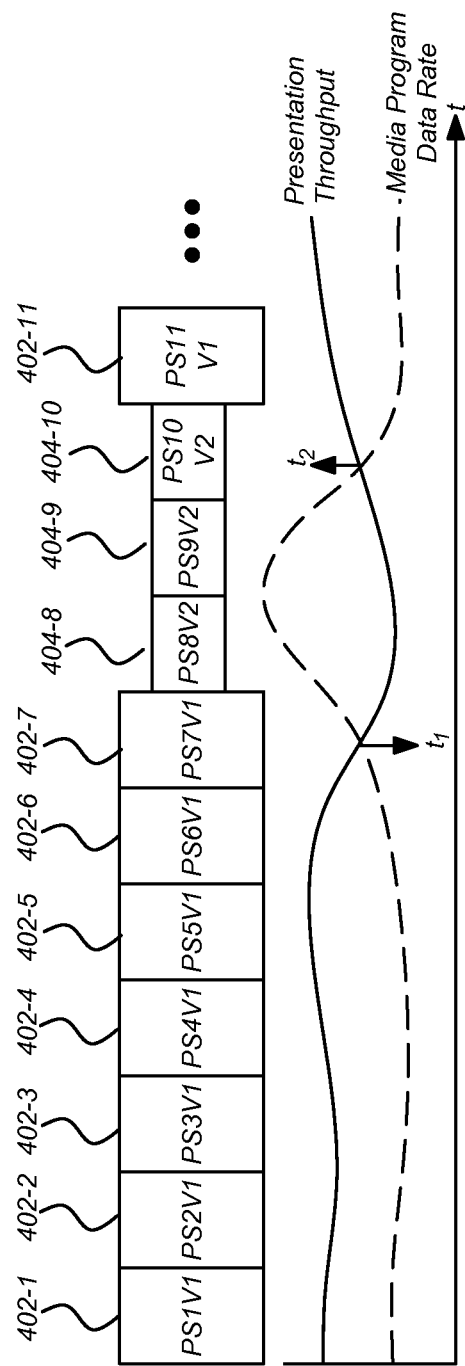
FIG. 5 is a diagram depicting the presentation of media program and advertisement segments subject to a communications channel and user device with varying throughput.

FIG. 5 is a diagram illustrating a simplified version of how the media program player 304 can receive media program segments while accounting for presentation throughput and/or media program data rate changes. As shown in FIG. 5, the data or bit rate of the media program can vary with time, as shown in the dashed line. At the same time, the presentation throughput (which may include, for example, the throughput of the communications channel by with the media program is received and/or the processing throughput of the user device 102) may also vary with time, as shown by the solid line.

In the illustrated example, the media program player 304 receives segments of the first (high presentation throughput) version of the media program 402-1 through 402-7 when the presentation throughput is greater than a minimum threshold. However, when the presentation throughput drops below the media program data rate at time $t_1$, the media program player may not be able to receive and process the high resolution version of the media program in a timely manner, and therefore requests and receives media program segments of the medium resolution (404-8 through 404-10).

When the presentation throughput increases above the media program data rate at time $t_2$, the media program player is able to receive and process the high resolution version of the media program in a timely manner, and therefore requests and receives media program segments of medium resolution (404-11, etc.).

Typically, the user device 102 includes a first-in-first-out (FIFO) buffer, and when the media program data rate is less than that of the presentation throughput, the user device 102 may buffer the data for later presentation. This buffer may ameliorate or delay the need for the user device 102 to switch to different segment versions. However, if the media program data rate exceeds the presentation throughput for a long enough period of time, the user device 102 will need to switch to a lower bit rate version of the media program as described above. Typically, the media program player 304 determines when a different version of the streamed media program is desired based on a variety of factors including the fullness of any buffer storing segments before presenting them to the user, processing load, and communications channel bandwidth.

It is also noteworthy that the since the live streaming protocol calls for the request and transmission of relatively short segments of the media program at a time, the media program data rate may vary little from segment to segment. In such cases, the media program player will request different segment versions based primarily on the presentation throughput.

The foregoing protocol works well so long as the media program does not include advertising or so long as the media program includes the same advertising for all viewers. In such cases, the advertisements need only be placed in the media stream, and the media player will be able to switch from one segment version to another so long as they represent the same information (which may include only a portion of the media program, only a portion of an advertisement, or a segment with both). However when the use is provided with advertisements that are selected based upon user preferences or other factors (hereinafter referred to as personalized or directed advertisements), the foregoing model does not work well. That is because when the user requests a media program, the media program would need to be retrieved, advertisements spliced in at the appropriate times, and segmented before the user device could receive the media program. Further, this process would need to be performed for all media program versions.

Figure 6:
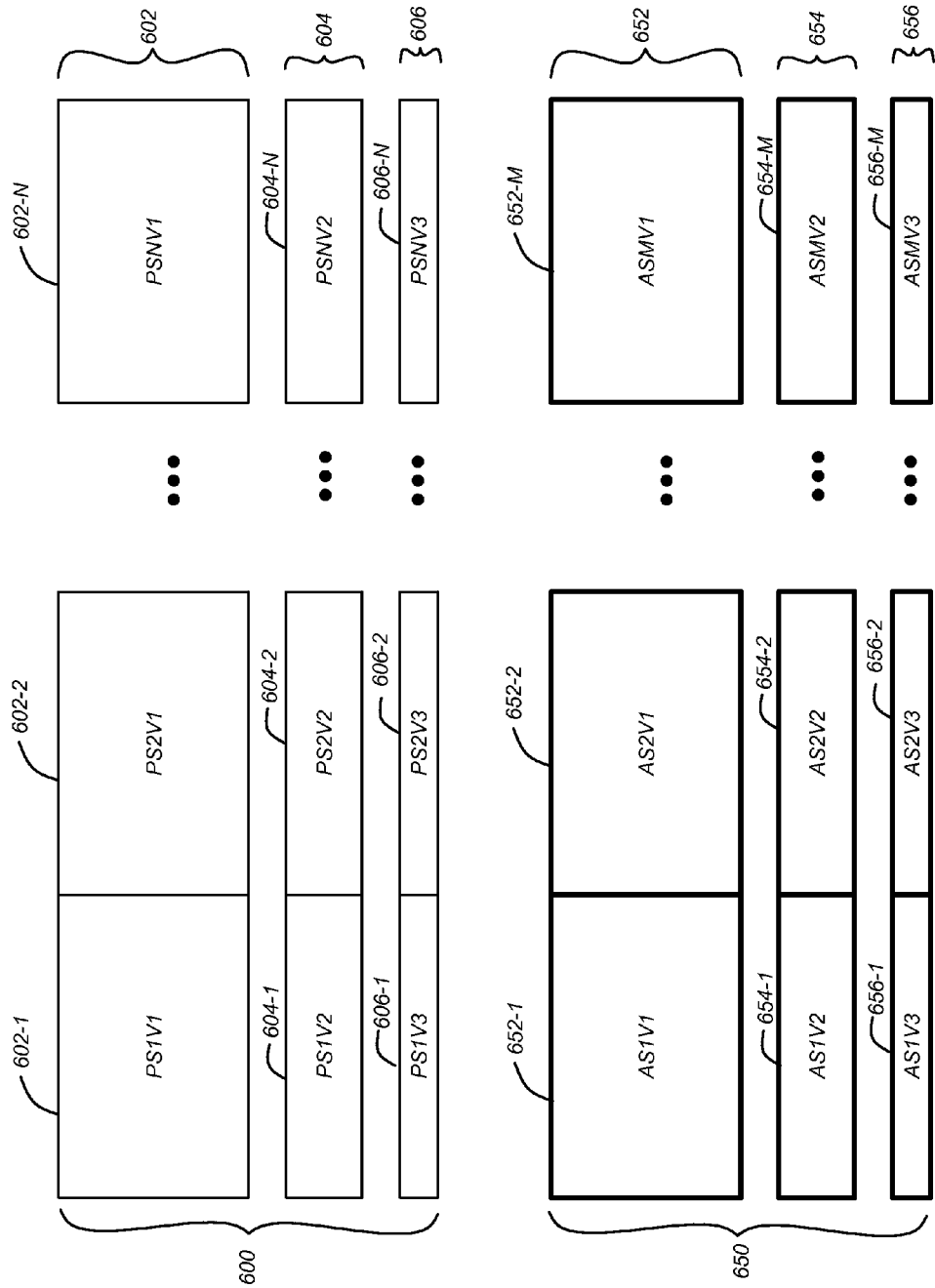
FIG. 6 is a diagram illustrating how the user device can receive media program segments while accounting for communication presentation throughput changes and also permitting the insertion of different advertisements for different users.

FIG. 6 is a diagram illustrating how the media program player 304 can receive media program segments while accounting for communication presentation throughput and media program bit rate changes while also permitting the insertion of different advertisements for different users. As before, different versions of the media program are generated. As before, the different versions of the media program 602-606 are separated into segments 602-1 through 606-N that typically are temporally the same length between versions. But in this case, the media program 600 excludes advertisements. Instead, different versions of the advertisements are generated (such as the three versions 652-656 of a first advertisement 650), and those different versions are also separated into segments 652-1 through 656-M. Like the media program segments 602-1 through 606-M, the advertisement segments 652-1 through 656-M need not be of the same temporal length, and may or may not be of equal length between versions.

Figure 7:
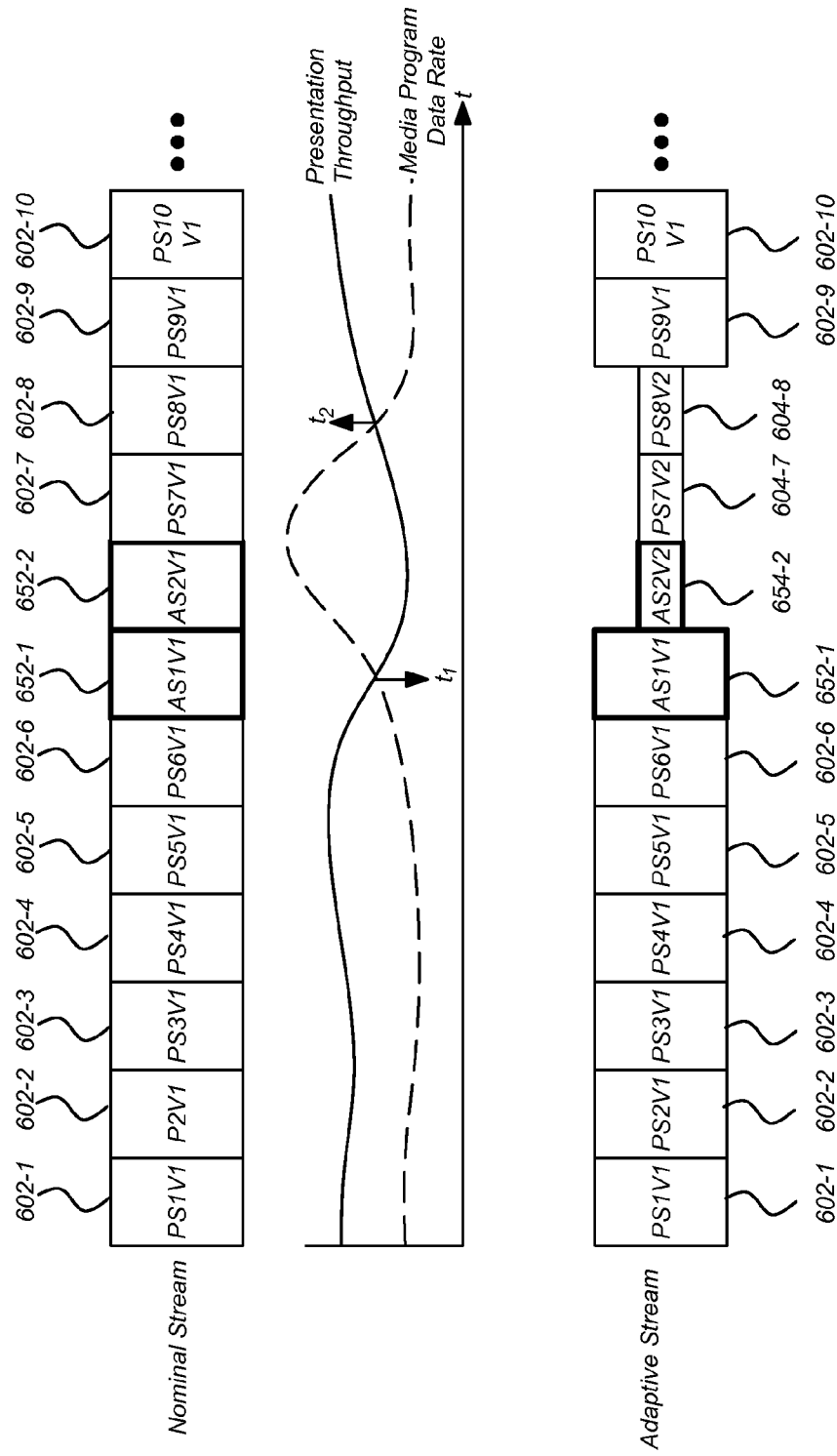
FIG. 7 is a diagram illustrating how the user device can receive media program segments and targeted advertisements while accounting for changes in available presentation throughput.

FIG. 7 is a diagram illustrating how the media program player 304 can receive media program segments and targeted advertisements while accounting for changes in available presentation throughput and the media program bit rate. If the presentation throughput were to remain above a minimum threshold for high quality playback, the media program player 304 simply requests the segments that together comprise the high resolution version of the media program, as shown in the top portion of FIG. 7. This would include the first six segments of the media program (PS1V1-PS6V1) 602-1 through 602-6 followed by the two segments of an advertisement (AS1V1-AS2V1) 652-1 through 652-2, then the next segments of the media program (PS7V1-PS10V1) 602-7 through 602-10. However, if the presentation throughput minimum required to play the media program (at time ti, for example), the present invention instead retrieves different versions of the advertisement so that playback can continue. For example, as shown in FIG. 7, after time ti, the media program player 304 requests segments AS1V1, PS7V2, and PS8V2, which are advertisement and media program segments of lower size and resolution that can be adequately transmitted over the communication channel and presented by the media program player 304. When the presentation throughput increases above the minimum necessary to play the media program, the next segments requested by the media program player 304 are the higher bandwidth versions of the media program PS9V1, PS10V1.

Figure 8A:
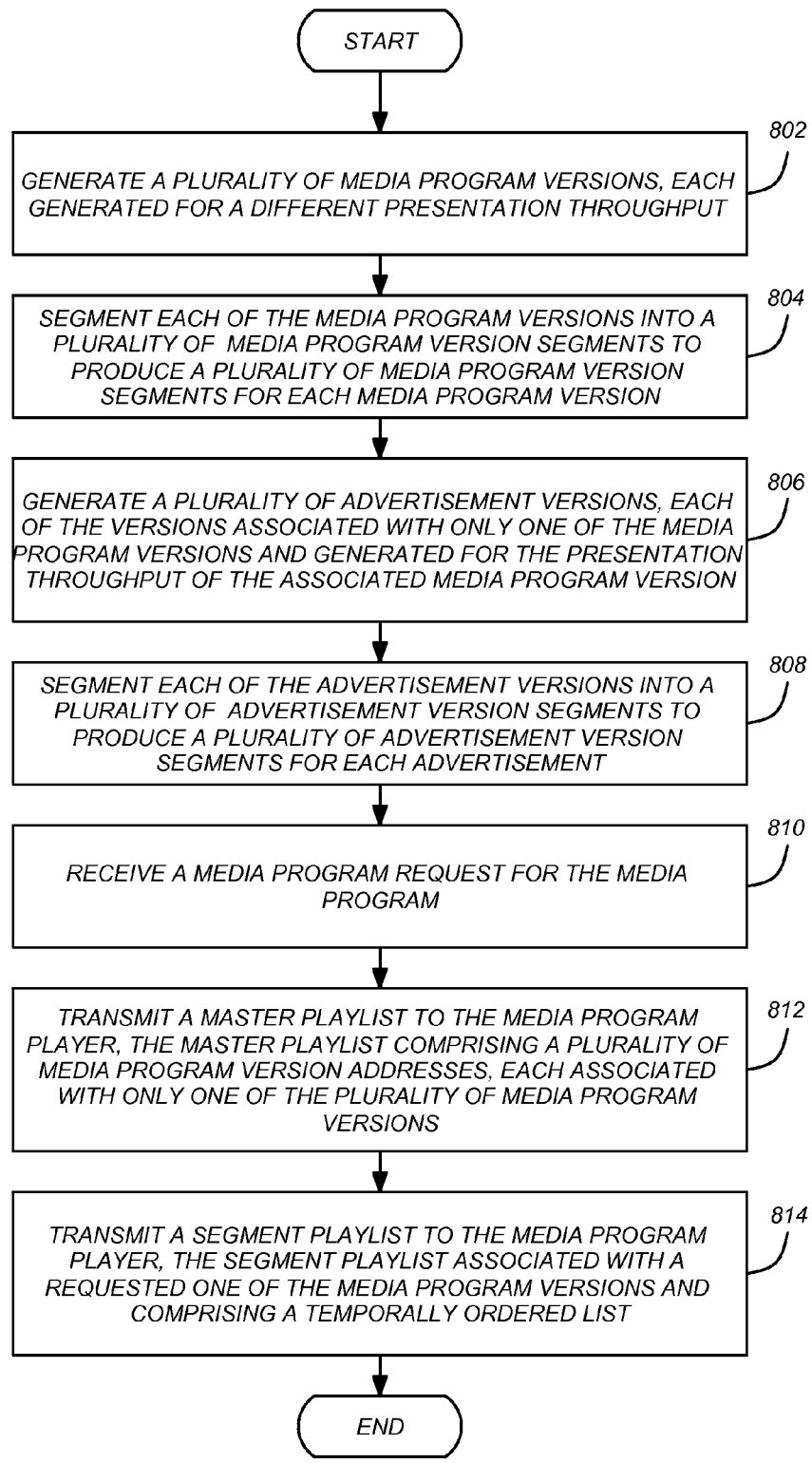
FIG. 8A presents a diagram illustrating exemplary method steps that can be used to stream media programs and advertisements.

The illustrated embodiment does not take buffering of data segments or the possible prediction of presentation throughput into account. Hence, although it would have been desirable to retrieve advertisement segment AS1V2 instead of the larger AS1V1, the media program player 302 simply requests that the next delivered segment be suitable for the currently available presentation throughput and media program data rate. In one embodiment, the media program player 304 can predict presentation throughput changes, and request different versions of the media program and advertisements based on these predicted changes. In another embodiment, the media program player 304 buffers the received segments well in advance of when they are presented, so that if the presentation throughput changed and a currently buffered but not presented segment cannot be adequately presented, the media program player has time to request a substitute segment with reduced processing requirements and present that segment instead. Embodiments in which the media program player can predict the media program data rate (e.g. either using information regarding the media program data rate or by inferring the expected data rate from other factors) are also possible FIG. 8A presents a diagram illustrating exemplary method steps that can be used to stream media programs and advertisements. In block 802, a plurality of media program versions 602-606 are generated for the media program, with each one of the media program versions 602-606 generated for a different presentation throughput. For example, a number of media program versions 602-606 may be generated, each at different bit rates or average bit rates. In block 804, each of those media program versions 602-606 are separated into a plurality of media program version segments (e.g. 602-1 through 606N), some of which will be transmitted to the media program player(s) 304. In the illustrated embodiment, media program version segments 602-1 through 602-N are generated for media program version 602, media program version segments 604-1 through 604-N are generated for media program version 604, and media program version segments 606-1 through 606-N are generated for media program version 606. These operations may be performed by a content segmentor 320 under control of the CMS 310

In blocks 806-808, similar operations are performed to generate a plurality of advertisement versions 652-656 and advertisement version segments 652-1 through 656-M.

Returning to FIG. 3, we now discuss the transmission and reception of the media program and advertisements in greater detail. As described above, a plurality of media program versions are generated by the media program provider (or another entity), with each version generated for a different presentation throughput than the other of the plurality of versions.

Using the user interface module 302, the user selects a media program for viewing, and the user device 102 transmits a request to the media program provider 110 for the media program. In the illustrated embodiment, the request comprises a user identifier (user ID) and an identifier of the requested media program, and is a request for metadata (in particular, the address of a master playlist for the media program) transmitted to a feed service 306. In one embodiment, the identifier of the requested media program transmitted with the metadata request is obtained from a program guide presented to the user via the user interface module 302. The program guide can include thumbnail representations of the media programs, and the user may select a media program by clicking on the thumbnail associated with the media program of interest.

Again referring to FIG. 8A, a media program request for the media program is received, as shown in block 810. The feed service 306 ultimately responds to the ID request with the master playlist that is required to receive and view the media program.

Figure 8B:
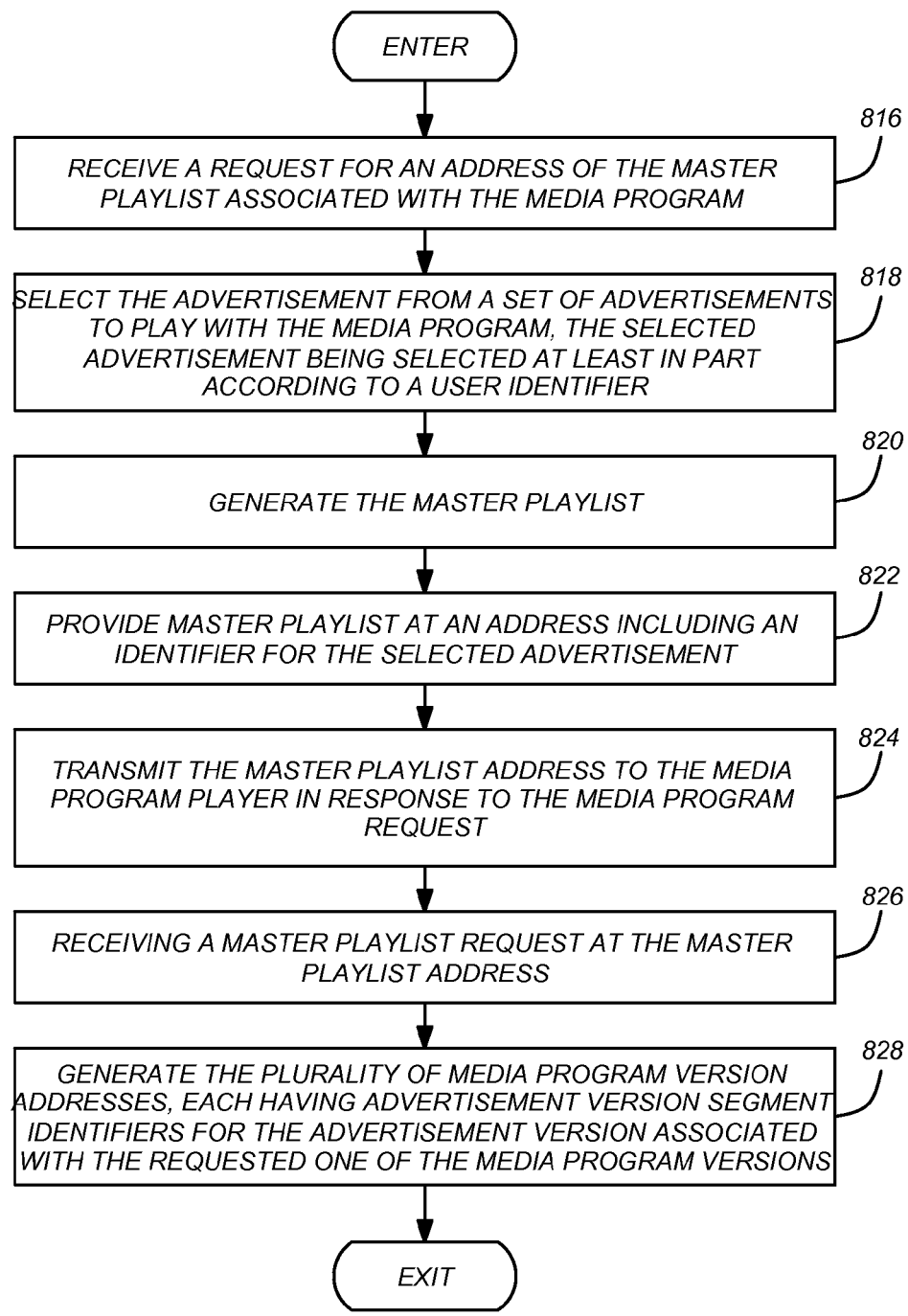
FIG. 8B is a diagram illustrating exemplary steps that can be used to generate the master playlist.

FIG. 8B is a diagram illustrating exemplary steps that can be used to generate the master playlist. FIG. 8B will be discussed in conjunction with FIG. 3.

A request for the address of the master playlist associated with the media program is received from the user device, as shown in block 816. In one embodiment, the request includes data identifying the media program of interest as well as data identifying the user 132, the user computer 102, and/or the media program player 304. This information can be used in embodiments in which advertisements selected for play in conjunction with the media program are selected based on user 132, user computer 102 or media program 304 data. The feed service 306 receives the request, and using information obtained from secure storage 312 and other databases 316, and the advertisement service 316 via the content management service 310, the feed service 306 determines the appropriate metadata for the selected media program, which may include the media program identifier (PID) and similar identifiers for any advertisements that are to be played along with the media program.

Since the media program provider 110 may have received a user ID or other information at least somewhat identifying the user, the media program provider 110 can invoke the advertising service 318 to determine which advertisements to include with the requested media program. These identifiers may be included with the metadata. This may be accomplished as described in co-pending patent application 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. Alternatively, this process can begin after the media program player has selected which version of the media program to begin with, as described below.

A master playlist is generated, as shown in block 820. In one embodiment, this is performed by the content selector 308. An exemplary master playlist is shown in FIG. 9, and is discussed further below. In block 822, the master playlist 900 is provided. In one embodiment, the master playlist 900 is provided at an address that may include an identifier for each of the advertisements selected as described above.

For example, the master playlist address may be:
https://play.hulu.com/play/50000011/mplst/b=[adlist]a=[authentication token]
wherein "50000011" represents the media program ID (PID) and the "adlist" is a list of advertisement segment identifier(s) 904 for the advertisement(s) that were selected to be inserted into the program during playback. The master playlist 900 address is transmitted to the user device 102, as shown in block 822 and in FIG. 3.

Next, the user device 102 receives the master playlist address 900, and transmits a master playlist request to the master playlist address received in block 824. As described above, the address may include the PID of the media program as well as a list of advertisement IDs that identify the advertisement(s) to be presented during playback of the media program.

The master playlist is received in the media program provider 110 at the master playlist address, as shown in block 826. A plurality of media program version addresses is generated, each having advertisement version segment identifiers 652-1 through 656-M for the advertisement version 652-656 associated with the requested one of the media program versions. The master playlist is created from the plurality of media program version addresses.

FIG. 9 is a diagram illustrating an exemplary master playlist 900. In this embodiment, the master playlist 900 has a file name that ends in ".m3u8" and/or has the content-type of "application/vnd.apple.mpegurl" and is a text file that comprises individual lines that are terminated by either a single LF character or a carriage return. Lines that start with the comment character '#' are either comments or tags, and tags begin with the letters EXT. All other lines that begin with '#' are comments and are ignored. The first line comprises an M3U tag which identifies the file as an extended m3u file. Next, the master playlist has a tag describing the media program version whose URI or URL is presented on the following line. For example, 902A presents a tag which identifies the following:

PROGRAM-ID: If the master playlist refers to more than one media program, the PROGRAM-ID parameter identifies which of the plurality of media programs is involved. In the illustrated embodiment, the master playlist refers to several versions of the same media program, so the PROGRAM-ID is a 1. If multiple media programs were included in the master playlist, the second media program would have a PROGRAM-ID of 2, for example. This PROGRAM-ID is not to be confused with the PID, which refers to an identifier for the media program on a global basis, not just within the master playlist.

BANDWIDTH: identifies the average bit rate of the stream available at the URI listed on the following line. The media program player can determine the actual bandwidth by observing the download speed of the segments.

The URI follows the tag, and includes the PID (in the illustrated example, 50000011), the file name (in the illustrated example, the bitrate with the ".m3u8" extension), advertising segment identifiers 904 (analogous to 652-1 through 656-M, 654-1 through 654-M or 656-1 though 656M) and a token that is used for authentication purposes.

Note that the master playlist shown in FIG. 9 includes tags and the URI for eight different versions of the media program, with the streams identified by 902A, 902B, 902C, 902D, 902E, 902F, 902G, and 902H representing 1500

Kbps, 3200 Kbps, 2500 Kbps, 1000 Kbps, 400 200 Kbps, 128 Kbps and 64 Kbps, respectively. Each of the advertisement IDs associated with each media program version address may differ from the advertisement IDs associated with other media program version addresses.

The master playlist 900 is transmitted to the user device 102, as shown in block 812 shown in FIG. 8A.

In the embodiment described above, the user ID was supplied with the request for the address of the master playlist and used to select advertisements that are of greatest interest to the user 132. Identifiers for these advertisements are returned in the master playlist address transmitted to the user device 102, and later, also in the addresses for the media program versions in the master playlist itself. This feature allows the identity of the selected advertisements to persist between generation of the master playlist the requested media program version and also between the different program versions without maintaining advertisement states by the media program provider 110. Given the large number of user devices 102 serviced, this feature greatly simplifies housekeeping.

In other embodiments, the list of advertisement(s) to be included with the media program may be generated after the master playlist address has been transmitted and before the master playlist is received. In this embodiment, the master playlist address will not include a list of advertisement IDs, but the master playlist itself may include this list.

In other embodiments, the user ID is not transmitted and used to identify advertisements to replay with the media program. Alternatively, the user's identity is sufficiently ascertained using other information such as by the use of cookies, the IP address of the user (thus giving information that can be used to determine the geographic location of the user and thus providing information about the user that can be used to select advertisements).

Referring to FIG. 3, the media program player 102 decides, given the expected presentation throughput and media program data rate (if available), which of the media program versions is most suitable for reception and presentation, and requests that media program version by transmitting a media program version request identifying one of the media program versions. In one embodiment, this is accomplished by requesting the particular media program version at the appropriate address shown in the master playlist. The initially chosen media program version may also be determined by viewer preference (e.g. the user may request a higher resolution version than would ordinarily be provided). In one embodiment, the media program version request comprises or is addressed to the URL or URI associated with the media program version that the media program player 102 selected. For example, if the media program player 102 selects the 1500 kbps version of the media program in the exemplary master playlist shown in FIG. 9, the media program player transmits the URI of 902A, namely:

https://play.hulu.com/play/50000011/
1500.m3u8?b=IUEfAAK7 . . . 580 to the media program provider 110. The media program provider 110 receives the message and generates a segment playlist (or retrieves one that has been pre-generated) associated with the selected media program version. This is accomplished by generating an address associated with each of the plurality of media program segments of the media program version in the media program version request, and generating an address associated with each of the plurality of advertisement segments of the advertisement(s) that are selected to be presented during the media program. The segment playlist is generated with these addresses and appropriate tags. In one embodiment, the segment playlist is temporally ordered (the segments are requested and played in the order presented on the list), however, other embodiments are possible wherein the segment playlist is in an arbitrary order and the playback order is either implicit (known to both the transmitter and receiver) or specified in data transmitted to the user device 102.

FIG. 10 is a diagram showing one embodiment of a segment playlist 1000. In the illustrated embodiment, the segment playlist comprises a list of addresses or uniform resource identifiers (URIs) associated with each of the media program segments of the requested media program version 1006A-1006C, and the advertisement segments 1004A-1004C of the advertisement version associated with the selected media program version (and which advertisement was selected by the media program provider 110 for presentation to the user). In one embodiment, addresses or URIs are temporally ordered. This temporal ordering may be inherent to the list (each entry in temporal order) or an index may be provided so that the temporal relationship between the segments can be determined.

The segment playlist 1000 may also include tags for the foregoing addresses and a pre-roll (before playback of the media program begins) advertisement 1002, and two discontinuity tags 1008, 1010. The discontinuity tags 1008, 1010 indicate an encoding discontinuity between the media file that follows it and the one that preceded it. The set of characteristics that may change include file format, number and type of tracks, encoding parameters, encoding sequence and/or timestamp sequence. In the example shown in FIG. 10, the discontinuities represent changes from a media program segment to an advertisement segment (discontinuity 1008, for example) or from an advertising segment to a media program segment (discontinuity 1010, for example).

Returning to FIG. 3, the media program provider 110 transmits the segment playlist to the user device 102. The user device 102 receives the segment playlist, and transmits segment requests to the media server 114, which retrieves the media program from storage 312 and transmits the requested media segments and advertisements to the user device. The user device 102 receives each media program and advertisement segment and plays them back to the user in the appropriate order.

In the foregoing embodiment, the segment playlist 1000 was transmitted separate from and subsequent to the master playlist 900, but this need not be the case. Instead, the media program player may send the master playlist 900 and the segment playlist 1000 together in a single message. In this case, once the media program player 304 selects the media program version of interest, the media program player may then simply request the media program or advertising segment for the appropriate media program and advertisement versions using the already received segment playlist 900.

If the presentation throughput remains sufficient throughout playback of the media program and the associated advertisements, the media program player 304 simply continues to receive the media program segments and advertisement sections for the currently selected version. However, if the presentation throughput becomes insufficient for the currently selected media program version (for example, at time ti shown in FIG. 7), the media program player 304 will instead select media program and advertisement segments from a segment playlist that provides the URIs for media program and advertisement segments that require less presentation throughput.

If the appropriate segment playlist 1000 has already been provided to the media program player 304, the media program player 304 need only request the appropriate segments using the appropriate URIs listed in the segment playlist 1000 for the appropriate media program and advertisement version.

If, however, the appropriate segment playlist 1000 has not been provided for a second media program version, a request is transmitted to the media program provider 110 requesting a segment playlist 900 for version of the media program and advertisements that is appropriate for the current or predicted presentation throughput. For example, in the exemplary master playlist shown in FIG. 10, the media program player 304 may select a 1000 kbps version of the media program and advertisements for future segments. This can be accomplished by transmitting a second media program version request to the URI associated with the 1000 KBPS stream. In the example shown in FIG. 9, this is the URI associated with 902D or:

https://play.hulu.com/play/50000011/1000.m3u8 . . .

The media program provider 110 thereafter transmits a second segment playlist to the media program player. Like the first segment playlist, the second segment playlist is a temporally ordered list having an address associated with each one of the media program segments associated with the second selected media version and an address associated with each one of the plurality of advertising segments associated with the advertisement version associated with the second one of the media program versions. In other words, a segment list 1000 with the lower bitrate media program segments and advertising segments is transmitted from the media program provider 110 to the media program player 304, where it is played.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of streaming a media program and an advertisement for presentation therewith, comprising:
generating a plurality of media program versions of the media program for a plurality of bitrates, each of the plurality of media program versions generated for a different bitrate in the plurality of bitrates;
segmenting each of the media program versions into a plurality of media program version segments to produce a plurality of media program version segments for each media program version of the media program;
generating a plurality of advertisement versions of the advertisement for the plurality of bitrates, each of the plurality of advertisement versions associated with only one of the media program versions and generated for a respective bitrate of the associated media program version;
segmenting each of the advertisement versions into a plurality of advertisement version segments to produce a plurality of advertisement version segments for each advertisement version;
receiving a media program request for playing the media program; determining a user identifier associated with the media program request; dynamically selecting the advertisement to be included during playing of the media program based on the user identifier;
generating a plurality of media program version addresses for the plurality of media program versions generated for the plurality of bitrates, wherein the plurality of media program version addresses include a plurality of advertisement version identifiers for the advertisement;
generating a master playlist including the plurality of media program version addresses;
transmitting the master playlist to a media program player; generating a segment playlist, the segment playlist associated with a requested one of the media program versions generated for a bit rate in the plurality of bitrates and comprising a temporally ordered list having:
a media program version segment address associated with each one of the plurality of media program version segments associated with the requested one of the media program versions, and
an advertisement version segment address associated with each one of the plurality of advertising segments for the advertisement version included in the respective media program version address for the requested one of the media program versions, each one of the plurality of advertising segments generated for the bitrate associated with the requested one of the media program versions; and
sending the segment playlist to the media program player, wherein the advertisement version identifiers that are included in the media program version addresses allow an identity of the selected advertisement to persist between generation of the master playlist and the requested media program version without maintaining an advertisement state for the selected advertisement after the transmitting of the master playlist.

2. The method of claim 1, wherein:
receiving the media program request comprises:
receiving a request for an address of the master playlist associated with the media program;
transmitting the master playlist comprises:
selecting the advertisement from a set of advertisements to play with the media program, the selected advertisement being selected at least in part according to the user identifier;
generating the master playlist and providing the master playlist at a master playlist address;
transmitting the master playlist address to the media program player in response to the media program request;
receiving a master playlist request at the master playlist address; and transmitting the master playlist in response to the master playlist request.

3. The method of claim 2, wherein:
each of the advertisement version segments of the selected advertisement is associated with an advertisement version segment identifier; and generating the master playlist comprises:
receiving the master playlist request at the master playlist address having the identifier of the selected advertisement, wherein the method further comprises:
generating the plurality of media program version addresses, each media program version address associated with only one of the plurality of media program versions, and each media program version address comprising the advertisement version identifier for the advertisement version of the selected advertisement associated with the respective one of the media program versions.

4. The method of claim 3, wherein the identifier of the advertisement version comprises a plurality of advertisement identifier characters and wherein each of the advertisement version identifiers comprise the plurality of advertisement identifier characters.

5. The method of claim 3, wherein transmitting the segment playlist to the media program player comprises:
receiving a segment playlist request at the media program version address of the requested one of the media program versions; and
transmitting the segment playlist in response to the received segment playlist request.

6. The method of claim 3, further comprising:
receiving a second segment playlist request at the media program version address of a second requested one of the media program versions generated for a second bitrate different from the bitrate of the requested one of the media program versions, the second segment playlist request addressed to the one of the plurality of media program version addresses associated with the second requested one of the media program versions, wherein the one of the plurality of media program version addresses includes the identifier of the selected advertisement generated for the second bitrate;
transmitting a segment playlist to the media program player, the segment playlist comprising a temporally ordered list having:
an address associated with each one of the media program segments associated with the second requested one of the media program versions; and
an address associated with each one of the plurality of advertising segments associated with the advertising version of the selected advertisement generated for the second bitrate associated with the requested one of the media program versions.

7. An apparatus for streaming a media program and an advertisement for presentation therewith, comprising:
one or more computer processors; and
a non-transitory computer-readable storage medium comprising instructions, that when executed, control the one or more computer processors to be configured for:
generating a plurality of media program versions of the media program for a plurality of bitrates, each of the plurality of media program versions generated for a different bitrate in the plurality of bitrates;
segmenting each of the media program versions into a plurality of media program version segments to produce a plurality of media program version segments for each media program version of the media program;
generating a plurality of advertisement versions of the advertisement for the plurality of bitrates, each of the plurality of advertisement versions associated with only one of the media program versions and generated for a respective bitrate of the associated media program version;
segmenting each of the advertisement versions into a plurality of advertisement version segments to produce a plurality of advertisement version segments for each advertisement version;
receiving a media program request for playing the media program; determining a user identifier associated with the media program request; dynamically selecting the advertisement to be included during playing of the media program based on the user identifier;
generating a plurality of media program version addresses for the plurality of media program versions generated for the plurality of bitrates, wherein the plurality of media program version addresses include a plurality of advertisement version identifiers for the advertisement;
generating a master playlist including the plurality of media program version addresses;
transmitting the master playlist to a media program player; generating a segment playlist, the segment playlist associated with a requested one of the media program versions generated for a bit rate in the plurality of bitrates and comprising a temporally ordered list having:
a media program version segment address associated with each one of the plurality of media program version segments associated with the requested one of the media program versions, and
an advertisement version segment address associated with each one of the plurality of advertising segments for the advertisement version included in the respective media program version address for the requested one of the media program versions, each one of the plurality of advertising segments generated for the bitrate associated with the requested one of the media program versions; and
sending the segment playlist to the media program player, wherein the advertisement version identifiers that are included in the media program version addresses allow an identity of the selected advertisement to persist between generation of the master playlist and the requested media program version without maintaining an advertisement state for the selected advertisement after the transmitting of the master playlist.

8. The apparatus of claim 7, wherein: receiving the media program request comprises:
receiving a request for an address of the master playlist associated with the media program;
transmitting the master play list comprises:
selecting the advertisement from a set of advertisements to play with the media program, the selected advertisement being selected at least in part according to the user identifier;
generating the master playlist and providing the master playlist at a master playlist address;
transmitting the master playlist address to the media program player in response to the media program request;
receiving a master playlist request at the master playlist address; and
transmitting the master playlist in response to the master playlist request.

9. The apparatus of claim 8, wherein:
each of the advertisement version segments of the selected advertisement is associated with an advertisement version segment identifier; and
generating the master playlist comprises:
receiving the master playlist request at the master playlist address having the identifier of the selected advertisement, wherein the method further comprises:
generating the plurality of media program version addresses, each media program version address associated with only one of the plurality of media program versions, and each media program version address comprising the advertisement version identifier for the advertisement version of the selected advertisement associated with the respective one of the media program versions.

10. The apparatus of claim 9, wherein the identifier of the advertisement version comprises a plurality of advertisement identifier characters and wherein each of the advertisement version identifiers comprise the plurality of advertisement identifier characters.

11. The apparatus of claim 9, wherein the means for transmitting the segment playlist to the media program player comprises:
receiving a segment playlist request at the media program version address of the requested one of the media program versions; and
transmitting the segment playlist in response to the received segment playlist request.

12. The apparatus of claim 9, further comprising:
receiving a second segment playlist request at the media program version address of a second requested one of the media program versions generated for a second bitrate different from the bitrate of the requested one of the media program versions, the second segment playlist request addressed to the one of the plurality of media program version addresses associated with the second requested one of the media program versions, wherein the one of the plurality of media program version addresses includes the identifier of the selected advertisement generated for the second bitrate;
transmitting a segment playlist to the media program player, the segment playlist comprising a temporally ordered list having:
an address associated with each one of the media program segments associated with the second requested one of the media program versions; and
an address associated with each one of the plurality of advertising segments associated with the advertising version of the selected advertisement generated for the second bitrate associated with the requested one of the media program versions.

13. A non-transitory computer-readable storage medium containing instructions for streaming a media program and an advertisement for presentation therewith, the instructions, when executed, control a computer system to be configured for:
generating a plurality of media program versions of the media program for a plurality of bitrates, each of the plurality of media program versions generated for a different bitrate in the plurality of bitrates;
segmenting each of the media program versions into a plurality of media program version segments to produce a plurality of media program version segments for each media program version of the media program;
generating a plurality of advertisement versions of the advertisement for the plurality of bitrates, each of the plurality of advertisement versions associated with only one of the media program versions and generated for a respective bitrate of the associated media program version;
segmenting each of the advertisement versions into a plurality of advertisement version segments to produce a plurality of advertisement version segments for each advertisement version;
receiving a media program request for playing the media program; ; determining a user identifier associated with the media program request; dynamically selecting the advertisement to be included during playing of the media program based on the user identifier;
generating a plurality of media program versions of the media program for a plurality of bitrates, each of the plurality of media program versions generated for a different bitrate in the plurality of bitrates;
segmenting each of the media program versions into a plurality of media program version segments to produce a plurality of media program version segments for each media program version of the media program;
generating a plurality of advertisement versions of the advertisement for the plurality of bitrates, each of the plurality of advertisement versions associated with only one of the media program versions and generated for a respective bitrate of the associated media program version;
segmenting each of the advertisement versions into a plurality of advertisement version segments to produce a plurality of advertisement version segments for each advertisement version;
receiving a media program request for playing the media program; determining a user identifier associated with the media program request; dynamically selecting the advertisement to be included during playing of the media program based on the user identifier;
generating a plurality of media program version addresses for the plurality of media program versions generated for the plurality of bitrates, wherein the plurality of media program version addresses include a plurality of advertisement version identifiers for the advertisement;
generating a master playlist including the plurality of media program version addresses;
transmitting the master playlist to a media program player;
generating a segment playlist, the segment playlist associated with a requested one of the media program versions generated for a bit rate in the plurality of bitrates and comprising a temporally ordered list having:
a media program version segment address associated with each one of the plurality of media program version segments associated with the requested one of the media program versions, and
an advertisement version segment address associated with each one of the plurality of advertising segments for the advertisement version included in the respective media program version address for the requested one of the media program versions, each one of the plurality of advertising segments generated for the bitrate associated with the requested one of the media program versions; and
sending the segment playlist to the media program player,
wherein the advertisement version identifiers that are included in the media program version addresses allow an identity of the selected advertisement to persist between generation of the master playlist and the requested media program version without maintaining an advertisement state for the selected advertisement after the transmitting of the master playlist.

14. The non-transitory computer-readable storage medium of claim 13, wherein:
receiving the media program request comprises:
receiving a request for an address of the master playlist associated with the media program;
transmitting the master play list comprises:
selecting the advertisement from a set of advertisements to play with the media program, the selected advertisement being selected at least in part according to the user identifier;
generating the master playlist and providing the master playlist at a master playlist address;
transmitting the master playlist address to the media program player in response to the media program request;
receiving a master playlist request at the master playlist address; and
transmitting the master playlist in response to the master playlist request.

15. The non-transitory computer-readable storage medium of claim 14, wherein:
each of the advertisement version segments of the selected advertisement is associated with an advertisement version segment identifier; and
generating the master playlist comprises:
receiving the master playlist request at the master playlist address having the identifier of the selected advertisement, wherein the method further comprises:
generating the plurality of media program version addresses, each media program version address associated with only one of the plurality of media program versions, and each media program version address comprising the advertisement version identifier for the advertisement version of the selected advertisement associated with the respective one of the media program versions.

16. The non-transitory computer-readable storage medium of claim 15, wherein the identifier of the advertisement version comprises a plurality of advertisement identifier characters and wherein each of the advertisement version identifiers comprise the plurality of advertisement identifier characters.

17. The non-transitory computer-readable storage medium of claim 15, wherein transmitting the segment playlist to the media program player comprises:
receiving a segment playlist request at the media program version address of the requested one of the media program versions; and
transmitting the segment playlist in response to the received segment playlist request.

18. The non-transitory computer-readable storage medium of claim 15, further comprising:
receiving a second segment playlist request at the media program version address of a second requested one of the media program versions, the second segment playlist request addressed to the one of the plurality of media program version addresses associated with the second requested one of the media program versions, wherein the one of the plurality of media program version addresses includes the identifier of the selected advertisement;
transmitting a segment playlist to the media program player, the segment playlist comprising a temporally ordered list having:
an address associated with each one of the media program segments associated with the second requested one of the media program versions; and
an address associated with each one of the plurality of advertising segments associated with the advertising version of the selected advertisement associated with the requested one of the media program versions.

* * * * *

UNITED STATES PATENT AND TRADEMARK OFFICE
CERTIFICATE OF CORRECTION

PATENT NO. : 9,721,254 B2
APPLICATION NO. : 12/950563
DATED : August 1, 2017
INVENTOR(S) : William Z. Holt et al.

It is certified that error appears in the above-identified patent and that said Letters Patent is hereby corrected as shown below:

In the Claims

In Column 18, Line 13, in Claim 1, please delete the paragraph:
"receiving a media program request for playing the media program; determining a user identifier associated with the media program request; dynamically selecting the advertisement to be included during playing of the media program based on the user identifier;"

Add the paragraphs:
--receiving a media program request for playing the media program;--
--determining a user identifier associated with the media program request;--
--dynamically selecting the advertisement to be included during playing of the media program based on the user identifier;--

In Column 20, Line 11, in Claim 7, please delete the paragraph:
"receiving a media program request for playing the media program; determining a user identifier associated with the media program request; dynamically selecting the advertisement to be included during playing of the media program based on the user identifier;"

Add the paragraphs:
--receiving a media program request for playing the media program;--
--determining a user identifier associated with the media program request;--
--dynamically selecting the advertisement to be included during playing of the media program based on the user identifier;--

In Column 22, Line 11, in Claim 13, please delete the paragraph:
"receiving a media program request for playing the media program;; determining a user identifier associated with the media program request; dynamically selecting the advertisement to be included during playing of the media program based on the user identifier;"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,721,254 B2

Add the paragraphs:
--receiving a media program request for playing the media program;--
--determining a user identifier associated with the media program request;--
--dynamically selecting the advertisement to be included during playing of the media program based on the user identifier;--